(12) United States Patent
Famme

(10) Patent No.: US 6,948,551 B1
(45) Date of Patent: Sep. 27, 2005

(54) METHOD FOR LEAKAGE CONTROL AND LOCALIZATION OF LEAKAGES IN THE INTERNAL FACES OF HEAT EXCHANGERS

(75) Inventor: Per Bruun Famme, Odense C (DK)

(73) Assignee: APV Heat Exchanger A/S, Kolding (DK)

( * ) Notice: Subject to any disclaimer, the term of this patent is extended or adjusted under 35 U.S.C. 154(b) by 0 days.

(21) Appl. No.: 09/937,260

(22) PCT Filed: Mar. 21, 2000

(86) PCT No.: PCT/DK00/00132

§ 371 (c)(1),
(2), (4) Date: Nov. 15, 2001

(87) PCT Pub. No.: WO00/57152

PCT Pub. Date: Sep. 28, 2000

(30) Foreign Application Priority Data

Mar. 22, 1999  (DK) ................. 1999 00392

(51) Int. Cl.[7] .............................................. G01M 3/02
(52) U.S. Cl. ................... 165/11.1; 73/40; 73/40.5 R
(58) Field of Search ............. 165/11.1; 73/40, 73/40.5 R

(56) References Cited

U.S. PATENT DOCUMENTS

| | | | |
|---|---|---|---|
| 3,790,345 A | 2/1974 | Manshfield | |
| 4,050,945 A | * 9/1977 | Suzuki | ...................... 503/208 |
| 4,104,910 A | * 8/1978 | Ogata et al. | ............. 73/862.53 |
| 4,328,700 A | 5/1982 | Fries | |
| 4,688,627 A | 8/1987 | Jean-Luc et al. | |
| 5,170,840 A | 12/1992 | Grunwald | |
| 5,759,857 A | 6/1998 | Goyal et al. | |

FOREIGN PATENT DOCUMENTS

| | | |
|---|---|---|
| EP | 0 597 659 A | 5/1994 |
| WO | WO 99/19706 A | 4/1999 |

* cited by examiner

*Primary Examiner*—L V Ciric
(74) *Attorney, Agent, or Firm*—Leydig, Voit & Mayer, Ltd.

(57) ABSTRACT

A method for leakage control and localization of leakages in a plate heat exchanger includes supplying a solution containing a fluorescent colorant to one of either a primary passageway or a secondary passageway of the heat exchanger, supplying a clear liquid to the opposite passageway, recycling the clear liquid, and detecting the presence of the fluorescent colorant in the clear liquid.

6 Claims, No Drawings

METHOD FOR LEAKAGE CONTROL AND LOCALIZATION OF LEAKAGES IN THE INTERNAL FACES OF HEAT EXCHANGERS

A first aspect of the present invention relates to a method of performing in situ leakage control in the internal faces that separate the product and service sides of heat exchangers.

A second aspect of the invention relates to a method of localizing leakages in the internal faces that separate the product and service sides of heat exchangers.

The two aspects of the invention can be used separately; the first aspect for leakage control and the second aspect for localization of leakages that have been detected. However, they are usually used in combination, whereby a determination is initially carried out whether a heat exchanger leaks, and subsequently—if any such leakage is detected—the location of the leakages is determined. It follows that, in accordance with a third aspect, the invention relates to a method comprising in situ leakage control and localization of leakages in the internal faces that separate the product and service sides of heat exchangers.

In the use of heat exchangers for heating and/or cooling liquids—including ia foodstuffs—it is of the utmost importance to the optimal functioning of the heat exchanger that the liquids on the product and service sides are separated completely. It is also of the utmost importance that impurities are not transferred from the product side to the service side, and vice versa, whereby cross-contamination may occur of the liquids that are subject to thermal treatment via the heat exchanger.

Contact between the liquids on the product and service sides is primarily a result of leakages—holes, cracks and the like in the surfaces between the product and service sides of the heat exchanger. Such leakages can occur during the manufacture proper of the heat exchanger, during mounting/assembly of the heat exchanger and during operation of the heat exchanger as a consequence of material stress and corrosion.

In the practice of the art to this date relating to checking for leakages in the faces between the product and service sides of heat exchangers, the leakage control was carried out by pressure drop measurement, conductivity measurement and ultrasound detection on the assembled, operative heat exchanger. In the detection of leakages a penetration test is subsequently carried out of the internal faces of the disassembled heat exchanger to accurately localise leakages. This practice is known ia from the disclosures of the company Bactoforce in their Qualitätsmanagement-Handbuch, section "Prüifung von Plattenwärmeaustauschern"

Leakage control by pressure drop measurement is carried out by application of pressure to the one side of the heat exchanger surface, following which detection of pressure drop will indicate that a leakage is present in the faces between the product and service sides.

This technology suffers from the overall weakness that it presupposes that the heat exchanger is without external leaks and that, in order for a measurable pressure drop to be detected within a reasonable measurement period, the leakage between the product and service sides must be considerable.

Measurement of conductivity for leakage control is based on the principle that if an electrolyte is supplied to the one side of a water-filled heat exchanger, a transmission of this electrolyte via leakages in the surfaces will entail an increase in the conductivity of the liquid on the other side of the heat exchanger. Leakage determination of this kind is usually performed with operative pressure on the electrolyte side and an amount of water circulating over a conductivity measurement device on the opposite side.

It is a substantial drawback of this method for leakage control that it presupposes a considerable transfer of electrolytes before significant measurement of conductivity can be achieved. For example, it presupposes a transferred amount of a 3.25 W/V % of NaCl-solution of 90 ml per 100 l of circulating water in which the conductivity is measured to obtain a change in conductivity of a scale of $10\,\mu S$, which is the value used by Bactoforce as its lower limit for detecting leakages.

The ultrasound method that has been developed for detecting leakages in plate heat exchangers and that is described in EP 734,511 comprises the steps of pressurised air on the one side of the stack of plates which is transmitted via leakages in the surface to the other and water-filled side of the stack of plates thus generates a sound that can be measured on the outside with an ultrasound transducer.

This technology is associated with the overall problem that leakages in the heat exchanger cannot be localised to a specific heat exchanger element, but exclusively to a more or less comprehensive segment of heat exchanger elements; and that the sound picture from a hole, in which much sound is generated, can interfere and mask the sound picture from another hole, in which less sound is generated, whereby the latter becomes undetectable; and that the leakage must be so comprehensive that a measurable sound is generated by the passage of air via the leakage. Finally, this technology does not lend itself for use with every type of heat exchangers; it is useful for plate heat exchangers only.

This means that detection of the presence, location and magnitude of leakages in the individual heat exchanger element presupposes a subsequent penetration test of all the elements contained in the segment of elements in which a sound picture has been measured, which means that the final detection of leakages is subject to the criteria, errors and deficiencies associated with such method.

Penetration testing of the internal faces between the product and service sides of the disassembled heat exchanger is typically carried out by a liquid substance being applied to either the product side or the service side, said substance being able to penetrate through leakages in the surface whereby the leakages are visualised when the presence of the penetrating substance is detected on the opposite side of the treated surface.

This technology, which is known from U.S. Pat. No. 4,745,797 relating to a method wherein a mineral oil based colour solution is applied to the surface of the object on which it is desired to perform the test. The colour solution that penetrates through leakages in the surfaces causes a subsequent colour reaction on the opposite side of the surface, thereby revealing the leakage.

An indirect colour method for localising cracks in a surface is described in DE patent No. 1,773,270, where the penetrating substance is not readily visible, but it is rendered visible by exposure to UV-light.

It is a general property of all penetration methods as described in the above-mentioned references that—used on the internal faces between product and service sides in heat exchangers—they presuppose disassembly of the heat exchanger and direct application of the penetrating substance on either the product or the service side of each individual heat exchanger element. Moreover, the only substances known today that possess the requisite penetrating properties are based on mineral oil, which causes serious problems, especially within the food industry.

This technology for detecting leakages in the internal faces between the product and service sides of heat exchangers is very time consuming and cumbersome from a financial point of view, and the technology does not lend itself for in situ leakage control while simultaneously determining the location of leakages, on the one hand because the method presupposes initial dismounting of the heat exchanger, and on the other hand because heat exchangers cannot, due to environmental and safety considerations in general, be filled with a mineral oil based penetrating substance in situ. Moreover, it is deficient with regard to detecting all the leakages that might be present in the surface while the heat exchanger is in operation, partly because the penetration is accomplished with the same pressure throughout the entire heat exchanger surface, and partly because the same pressure prevails on the product and the service sides. In operating conditions, the heat exchanger surfaces are exposed to elevated and very different pressures as well as pressure differences between the product and service sides.

The technology known and used today for leakage control and localisation of leakages in the internal faces between the product and service sides in heat exchangers with a view to control and replacement of leaking elements does not—irrespectively of the chosen technique or combination of known techniques—lend itself for use for in situ leakage control with simultaneous localisation of leakages. Moreover, the technologies are associated with very substantial drawbacks and costs, which entails that they are not suitable as such.

The most considerable drawbacks consist in the technology being deficient or unsuitable with regard to obtaining a reliable and, while the heat exchanger is in operation, complete leakage control; and that localisation of leakages cannot be performed in situ and can only be performed on the disassembled heat exchanger; and that the technology is very expensive and time-consuming.

Thus, novel technologies are very much in demand, by which it is possible to perform in situ leakage control while accurately simulating actual operative conditions; to swiftly, uniformly and in a completely reproducible manner ensure that heat exchangers function optimally by the internal surfaces between product and service sides internally of the heat exchanger being completely without leakages and without any risk of transmitting and cross-contaminating the liquid substances—including foodstuffs—that are subjected to thermal treatment in the heat exchanger.

With the method according to the first aspect of the invention a surprisingly simple, swift, inexpensive and reliable technology is provided whereby this result can be achieved.

In accordance with the invention, a first step is concerned with leakage control, wherein one of the primary and secondary sides of a plate heat exchanger is supplied with a colorant liquid while the opposite side is supplied with a clear liquid that is recycled. The presence of leakages in the heat exchanger is verified by detection of the presence of colorant in the clear liquid. Hereby a reliable indication is obtained whether the heat exchanger leaks, and since it does not present any problems to find an environmentally friendly and very powerful colorant that can be measured in very small concentrations in the clear liquid, the method is both reliable and inexpensive. Moreover, it is quite simple to imitate the operating conditions during the leakage control, thereby ensuring that the control does in fact indicate the leakages that will occur in actual operation, neither more nor less.

In accordance with the second aspect of the invention, certain advantages are achieved when a colorant-containing liquid is supplied to one side of the heat exchanger, and when this side is pressurised for a period of time. The other side is maintained at ambient in that it contains air. After the period of time, the heat exchanger is drained and the plates are separated. Leakages are then determined by visual inspection of the plates. It is possible to find a colorant for this purpose that will, on the one hand, be readily dissolved and, on the other hand, subsequently produce very clear indications on the opposite side of the locations of the leakages. At the same time it is very simple, by this method, to imitate the heat exchanger operating conditions. This means that the detected leakages are the same or about the same as will appear in actual operation.

Hereby it is possible to visually detect all leakages throughout the entire internal face of the heat exchanger, and to do so on each of the internal surface elements that separate the product and service sides of the heat exchanger.

In accordance with an optional feature of the invention, the leakage control and the localisation of leakages may be accomplished in conditions that are very close to or identical with the actual operating conditions of the heat exchanger. This involves substantial advantages since the leakages detected in this manner will be the exact same as those occurring in ordinary operation of the heat exchanger.

The colorant used can be any one of liquid or dissolvable colorant or mixtures of such substances that will, in an aqueous and highly diluted in-use solution, directly—or by means of UV-light—trigger a visualisation.

According to an embodiment as featured in claim 8, an aqueous solution of the fluorescent colorant uranine (the sodium salt of fluoresceine) is used that distinguishes itself in having a very intense colouring and powerful fluorescence that makes it easy to visualise with UV-light in very small amounts (a dilution of uranine in a ratio of 1 to 200 mill in pure water can readily be detected by the human eye), and in being approved for use as trace substance for, among other things, life saving at sea, tracing of subterranean water current and checking of weak blood circulation in humans. Thus there will not be any problems associated with obtaining permissions to use this substance in the foodstuffs industry, and it does not present an environmental hazard.

As explained above, considerable advantages are achieved with use of the methods for leakage control and localisation of leakages in accordance with the invention. These advantages may be obtained by performing a leakage control in a first step by supplying a colorant-containing solution to one of the product and service sides of the heat exchanger. A of the heat exchanger. A clear liquid that is preferably recycled is applied to the opposite side. The presence of leakages in the heat exchanger is verified by detection of the colorant in the clear liquid. Also, the presence of leakages may be revealed by pressurisation of the side containing the colorant-containing solution for a period of time while the other side is allowed to continue to contain air. The heat exchanger is thereafter drained and disassembled, and the localisation of the leakages is determined by visual inspection of the plates.

Hereby leakages are detected in an exact manner and localised with a single test liquid as a direct consequence of the colorant being transmitted via the leakages in the surfaces between the product and service sides, and the thus proportional amount transmitted to the surface.

It is enabled by the method to carry out the leakage control and the localisation of leakages under conditions that correspond to the actual operating conditions of the heat exchanger.

This renders the method according to the invention equally suitable for control of leakages in all types of heat exchangers in true operating conditions independently of the specific construction, field of use and operating specifications of the individual heat exchanger (pressure, temperature, viscosity of liquids, etc.).

Now follows an explanation of an exemplary procedure for the method when used in a plate heat exchanger:

1. The secondary side of the heat exchanger is filled with an aqueous colour-solution and this side is pressurised at eg 6 bar.
2. The primary side of the heat exchanger is recycled with pure water via pump and balance tank.
3. After approximately 15 minutes a water sample is extracted from the balance tank, the colour of said sample being visually, and optionally by means of UV-light, compared to a sample of pure water.
4. In case the water sample from the balance tank is devoid of colour and like the pure water sample, the heat exchanger does not leak, and the procedure is discontinued. If the water sample from the balance tank is coloured compared to the pure water test, the heat exchanger leaks, and the procedure continues.
5. The primary side of the heat exchanger is drained and is allowed to stand for eg 15 more minutes while pressurised.
6. The heat exchanger is opened and the plate surfaces of the primary side are inspected visually and optionally by means of UV-light to detect discoloration of the surface.
7. Discoloured plate surfaces have leakages and are replaced, following which the heat exchanger is assembled and is again ready for operation.

As will appear the leakage control and localisation of leakages is performed by use of the same colorant solution, and it will be possible to regulate the conditions in which the leakage control as well as the localisation of leakages are performed, in order to hereby ensure that they correspond essentially to the actual operating conditions of the heat exchanger.

What is claimed is:

1. A method for leakage control of the internal faces that separate a primary side and a secondary side of a plate heat exchanger, wherein the primary side contains a product and the secondary side contains a heat exchanging fluid maintained at a differential pressure with respect to the product disposed in the primary side during normal operation of the heat exchanger, the method comprising the steps of:

supplying a colorant-containing liquid to one of either the primary side or the secondary side of the heat exchanger, supplying a clear liquid to the other one of the primary side or the secondary side, maintaining a differential pressure between the primary side and secondary side that corresponds to the differential pressures prevailing during normal operation of the heat exchanger, recycling the clear liquid, and determining whether leakages in the plate heat exchanger are present by detecting the presence of the colorant in the clear liquid that has been recycled.

2. A method according to claim 1 wherein the viscosity of the colorant-containing liquid corresponds to the viscosity of a given liquid that passes through the corresponding side of the plate heat exchanger in actual operation.

3. A method according to claim 1 wherein the colorant is a fluorescent substance.

4. A method according to claim 1 wherein the detection of the colorant is effected by use of UV-light.

5. A method according to claim 1 wherein the colorant is a salt of fluoresceine.

6. A method as in claim 5 wherein the salt of fluoresceine is a sodium salt uranine.

\* \* \* \* \*

UNITED STATES PATENT AND TRADEMARK OFFICE
CERTIFICATE OF CORRECTION

PATENT NO.   : 6,948,551 B1
DATED        : September 27, 2005
INVENTOR(S)  : Famme It is certified that error appears in the above-identified patent and that said Letters Patent is hereby corrected as shown below:

<u>Column 6,</u>
Line 38, "is a sodium salt uranine" should read -- is uranine --.

Signed and Sealed this

Thirty-first Day of January, 2006

JON W. DUDAS
*Director of the United States Patent and Trademark Office*